United States Patent

[11] 3,631,935

[72] Inventor Aniese Edward Seed
 Toledo, Ohio
[21] Appl. No. 70,208
[22] Filed Sept. 8, 1970
[45] Patented Jan. 4, 1972
[73] Assignee The Reliance Electric and Engineering Company
 Toledo, Ohio
 Original application Jan. 13, 1969, Ser. No. 790,605, now Patent No. 3,580,095, dated May 25, 1971. Divided and this application Sept. 8, 1970, Ser. No. 70,208

[54] CONSTANT MESHING FORCE RACK AND PINION FOR WEIGHER
 1 Claim, 3 Drawing Figs.
[52] U.S. Cl. .................................................. 177/174,
 177/223, 74/409, 74/422
[51] Int. Cl. ....................................................... F16h 55/18,
 F16h 1/04, G01g 1/02

[50] Field of Search........................................... 74/409,
 422; 177/164, 174, 216–224, 225, 230

[56] References Cited
 UNITED STATES PATENTS
| 1,364,385 | 1/1921 | Koplin............................ | 177/218 X |
| 2,244,621 | 6/1941 | Hurt.............................. | 177/174 |
| 2,548,603 | 4/1951 | Hallstrand..................... | 74/409 |
| 2,592,500 | 4/1952 | Williams........................ | 177/164 |
| 3,161,244 | 12/1964 | Hanssen....................... | 177/164 X |

*Primary Examiner*—Robert S. Ward, Jr.
*Attorney*—Thomas H. Grafton

ABSTRACT: In a condition responsive device, such as a load-responsive weighing scale, a rotatably mounted pinion is engaged with a pivotably mounted balanced rack which is movable in response to change in the condition. A spring is provided for urging the rack into engagement with the pinion and for maintaining the meshing force between the rack and the pinion substantially constant during all positions of the rack.

INVENTOR.
ANIESE E. SEED

INVENTOR.
ANIESE E. SEED

CONSTANT MESHING FORCE RACK AND PINION FOR WEIGHER

This application is a division of application Ser. No. 790,605, filed Jan. 13, 1969, now U.S. Pat. No. 3,580,095, issued May 25, 1971, in the name of Aniese E. Seed.

The invention relates to a condition responsive device such as the weighing scale disclosed in U.S. Pat. No. 2,592,500 issued Apr. 8, 1952 to L. S. Williams. The prior scale has a problem of nonrepeatability due to frictional force between the load-responsive rack which drives the indicator pinion. The frictional force is a function of the meshing force between the rack and pinion and, since such meshing force varies as load upon the scale is varied, it always has been a factor in weighing inaccuracies.

The objects of this invention are to improve condition responsive devices, to provide a constant meshing force rack and pinion, and to increase the accuracy of weighing scales.

The above and other objects and features of this invention will be appreciated more fully from the following detailed description when read with reference to the accompanying drawings wherein.

Figure 1:
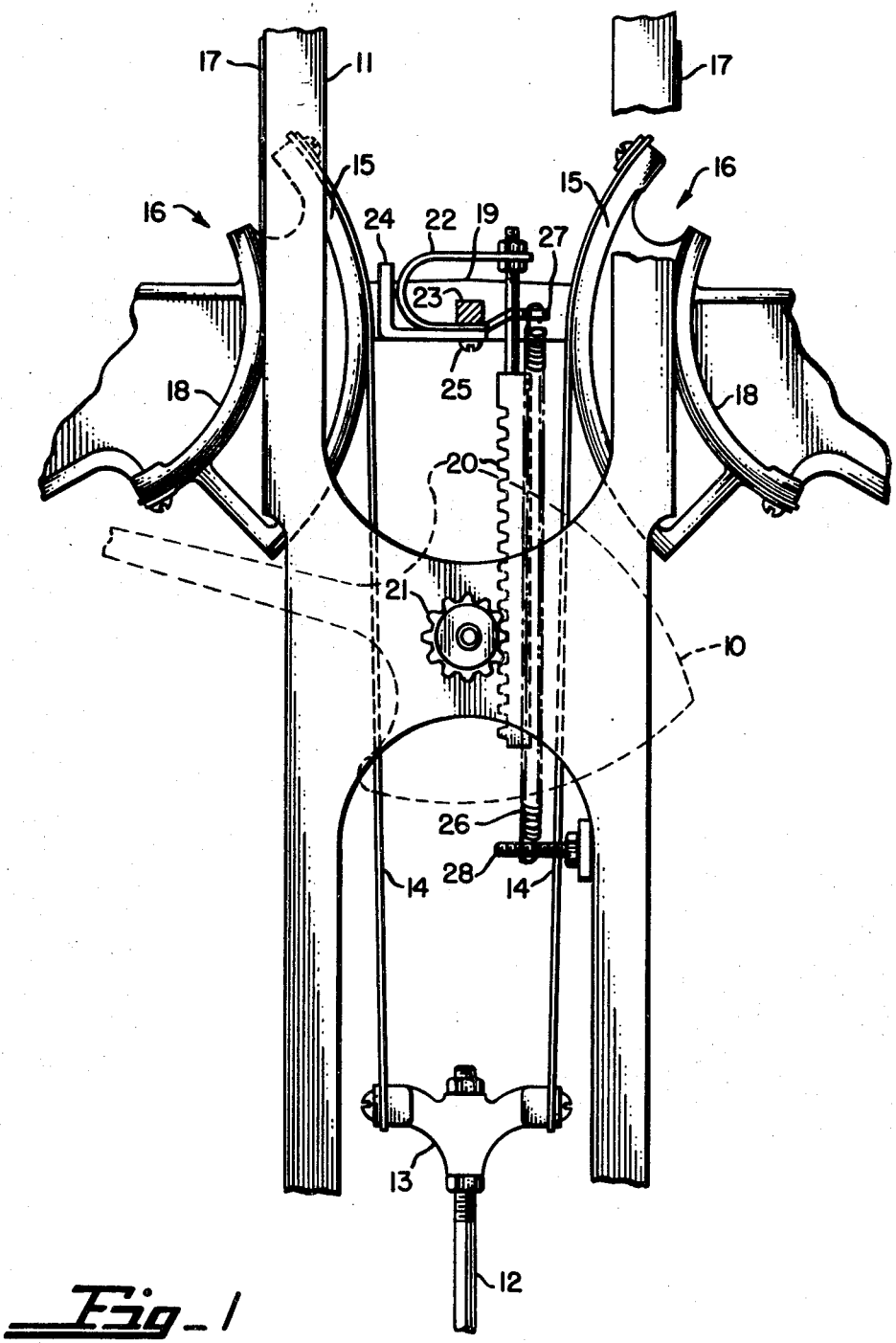
FIG. 1 is a fragmentary elevational view of a weighing scale.

FIG. 1 is a copy of part of FIG. III in the above U.S. Pat. No. 2,592,500. Part of load counterbalancing and indicating mechanism of a weighing scale is illustrated in FIG. 1. The mechanism includes an indicator 10 that indicates the magnitude of the load being counterbalanced. A sector guide 11 is mounted vertically within the scale and the force of loads placed on a load receiver are transmitted through a steelyard 12 and yoke 13 to a pair of ribbons 14 attached to power sectors 15 of a pair of load counterbalancing pendulums 16. The pendulums 16 are suspended from the sector guide 11 by means of steel ribbons 17 that are attached to the bottom ends of fulcrum sectors 18 and extending upwardly along the sides of the sector guide 11 are attached at its upper end.

A pair of compensating bars 19, only one of which is shown in FIG. 1, is carried by the pendulum 16 (attachment shown in the above U.S. Pat. No. 2,592,500). A rack 20 suspended from the midpoints of the compensating bars 19 engages and drives a pinion 21 mounted on the indicator shaft. When loads are applied to the steelyard rod 12 the pendulums 16 roll upwardly along the sector guide 11 through a distance that is proportional to the applied load. The compensating bars 19 carry the rack 20 upwardly through a distance that is equal to the average translation of the two pendulums and by meshing with the pinion 21 drives the indicator 10 through a corresponding angle. The rack 20 is carried by a shock-absorbing lever 22 which is attached to a square bar 23 that is pivotally carried between the compensating bars 19. Thus, the rack 20 is pivotally mounted and is movable in response to change in load.

Figure 2:
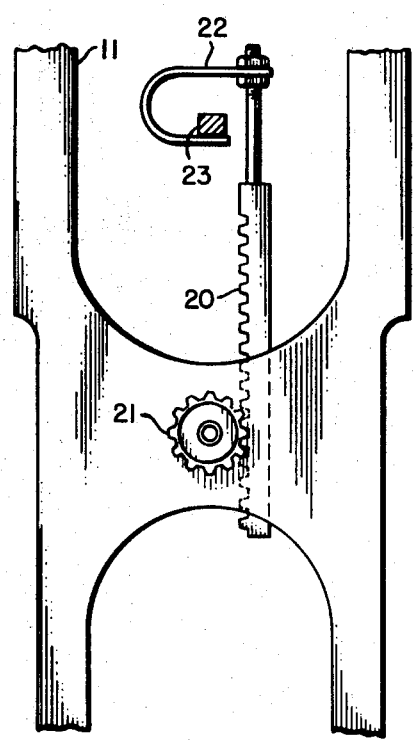
FIG. 2 is an enlarged view of part of FIG. 1 showing the constant meshing force mechanism removed.

The rack 20 as shown in FIG. 2 and in the above U.S. Pat. No. 2,592,500 is held in engagement with the pinion 21 by torque about the pivotal axis of the bar 23. This torque is equal to the meshing force between the rack 20 and pinion 21 multiplied by the vertical distance between the axis of rotation of the pinion 21 and the pivotal axis of the square bar 23, or the meshing force is equal to the torque divided by such distance. At zero load upon the scale, such distance is at the minimum (FIG. 3) and as the load increases such distance increases (FIG. 2 shows three-quarter load position). The meshing force at full load capacity must be great enough to keep the rack and pinion engaged. Hence, at zero load capacity the meshing force is far greater than is desired. The prior arrangement has a problem of nonrepeatability due to frictional force between the rack and pinion. The frictional force is a function of the coefficient of friction and the meshing force and, since such meshing force varies as load upon the scale is varied, it is a factor in weighing inaccuracies. Ideally, the light meshing force at full load capacity needed to keep the rack and pinion engaged should be the same at all load positions.

Figure 3:
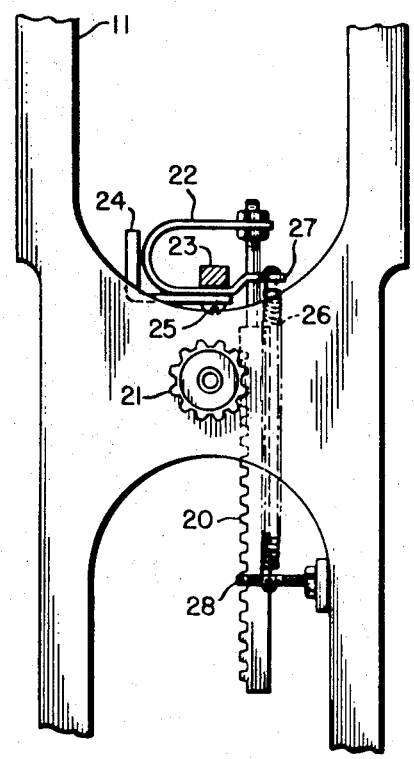
FIG. 3 is an enlarged view of part of FIG. 1 showing the constant meshing force mechanism.

The foregoing ideal condition is achieved by the rack and pinion arrangement shown in FIGS. 1 and 3. The prior torque about the pivotal axis of the bar 23 is balanced by an L-shaped weight 24 which is attached to the bottom of the C-shaped lever 22 by means of a screw 25, the screw 25 extending through a slot in the weight making the weight adjustable. The weight 24 is so positioned that the rack 20 hangs vertical when a corrector spring 26 hereinafter described is attached to the lever 22. The rack thus is pivotably mounted and balanced, i.e., the meshing force between the rack and pinion is zero.

The spring 26 is attached at its upper end to an extension 27 of the C-shaped lever 22 at a point on the horizontal centerline through the pivotal axis of the bar 23. In the initial adjustment at zero load, (FIG. 3 position), the spring 26 is allowed to hang free and the rack 20 is balanced until it hangs vertical. Then the bottom of the spring 26 is stretched a distance equal to the vertical distance between the axis of rotation of the pinion 21 and the pivotal axis of the bar 23 and anchored on a pin 28 extending from the sector guide 11. Stretching the spring 26 returns torque to the system, such torque (T) being equal to the spring constant ($k$) of the spring times the vertical distance ($l$) between the axis of rotation of the pinion 21 and the pivotal axis of the bar 23 times the horizontal distance ($d$) from the pivotal axis of the bar 23 to the vertical centerline of the spring 26. The spring force is equal to such spring constant ($k$) times such vertical distance ($l$). That is, Spring force $= kl$ Torque $= kld =$ Meshing force $l$.

By canceling the $l$s, the meshing force is seen to be independent of load upon the scale because change in load does not vary the spring constant ($k$) or the horizontal distance ($d$). Thus, a spring 26 can be chosen which has a suitable spring constant to produce a suitable meshing force (just enough to keep the rack and pinion engaged) and this meshing force remains constant for all positions of the rack 20 (i.e., for all positions of the indicator 10). As load is increased, the vertical distance ($l$) between the axis of rotation of the pinion 21 and the pivotal axis of the bar 23 increases tending to decrease the meshing force F (F = Torque divided by $l$); however, to balance the tendency to decrease the meshing force the spring 26 stretches as load is increased tending to increase the meshing force.

The lever 22 is pivotably mounted and movable in response to change in load, the rack is carried by the lever and is meshed with the pinion, and the weight 24 is weight means carried by the lever to so balance the rack that the meshing force between the rack and pinion substantially is zero. The spring 26 is spring means having one end anchored and the other end movable with the rack for producing a torque urging the rack into engagement with the pinion and for maintaining the meshing force between the rack and pinion substantially constant during all positions of the rack; the spring force being substantially parallel to the path of motion of the rack. There is a finite vertical distance between the pivot points for the rack and pinion at zero load and the spring means in an initial adjustment is stretched a distance equal to said finite vertical distance at zero load.

It is to be understood that the above description is illustrative of this invention and that various modifications thereof can be utilized without departing from its spirit and scope.

Having described the invention, I claim:

1. In a weighing scale, in combination, a rotatably mounted pinion, a load indicator driven by the pinion, a pivotably mounted lever movable in response to change in load upon the scale, a rack carried by the lever and engaged with the pinion, weight means carried by the lever to so balance the rack that the meshing force between the rack and pinion substantially is zero, there being a finite vertical distance between the pivot point of the lever and the axis of rotation of the pinion at zero load, and spring means initially stretched a distance equal to said finite vertical distance having one end anchored and its other movable as one with the rack and located relative to the pivot point of the rear to produce a torque urging the rack into mesh with the pinion, the spring force being substantially parallel to the path of motion of the rack and the spring means being stretched as said finite vertical distance increases under the influence of load upon the scale to maintain the meshing force between the rack and pinion substantially constant during all positions of the indicator.

* * * * *

FO-1050
(5/69)

UNITED STATES PATENT OFFICE
CERTIFICATE OF CORRECTION

Patent No. 3,631,935     Dated January 4, 1972

Inventor(s)  Aniese Edward Seed

It is certified that error appears in the above-identified patent and that said Letters Patent are hereby corrected as shown below:

Column 2, line 74, "rear" should read --lever--.

Signed and sealed this 11th day of July 1972.

(SEAL)
Attest:

EDWARD M. FLETCHER, JR.
Attesting Officer

ROBERT GOTTSCHALK
Commissioner of Patents